Dec. 21, 1965   G. ENGSTROM   3,225,288
EXCITER SET FOR SYNCHRONOUS GENERATORS
Filed Oct. 16, 1962

INVENTOR.
Gunnar Engstrom
BY
Bailey, Stephens & Huettig
ATTORNEYS

United States Patent Office 3,225,288
Patented Dec. 21, 1965

3,225,288
EXCITER SET FOR SYNCHRONOUS GENERATORS
Gunnar Engstrom, Ludvika, Sweden, assignor to Allmanna Svenska Elektriska Aktiebolaget, Vasteras, Sweden, a corporation of Sweden
Filed Oct. 16, 1962, Ser. No. 230,864
Claims priority, application Sweden, Nov. 17, 1961, 11,442/61
8 Claims. (Cl. 322—73)

The present invention relates to a device for exciting a synchronous generator with rotating field by means of a rectifier exciter having controlled semi-conductor rectifiers with ionic rectifier characteristic.

In certain fields of use for synchronous generators it is desirable that the excitation voltage of the main generator shall follow the excitation current of the exciter machine even when this alters direction. Within other fields of use it is necessary to regulate the excitation current of the main machine arbitrarily both as regards polarity and magnitude.

With synchronous generators it is known to supply excitation current to the field winding of the generator via rectifiers. It is also known with such devices to regulate the magnitude of the excitation current by, for example, feeding the mentioned rectifiers via a mixing transformer fed by a load-dependent current, and a load-independent current. The latter current is suitably derived through inductances connected to the generator, whereby the magnitude of the excitation current can be regulated by means of, for example, adjustable inductances and a direct current excitation of the transformer core.

The control possibilities with the mentioned devices, however, are extremely limited and in certain cases unsatisfactory. The present invention, on the other hand, which allows a very large control range, is built on the principle that controlled semi-conductor rectifiers having ionic rectifier characteristic are applied on the shaft of the main generator and fed from a generator with rotating armature, while the control voltage for the rectifiers is obtained from one or more generators with rotating armatures connected on the same shaft as the main generator and the exciter machine. The invention is characterized in that the field winding of the synchronous generator is connected to the exciter by means of two rectifier groups formed by the semi-conductor rectifiers mutually antiparallel-connected, one rectifier group operating as inverter, the other operating as rectifier.

Figure 1:
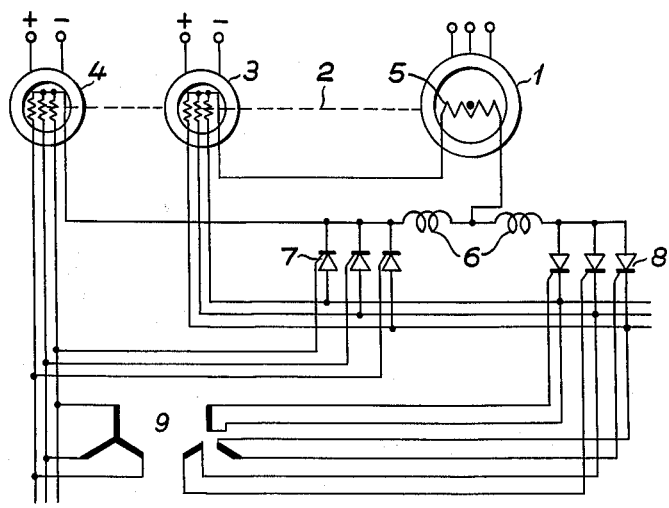

The invention is described in the following with reference to the accompanying schematical drawing in which FIGURE 1 shows an exciter set according to the invention with one control voltage generator and FIGURE 2 a second embodiment of the invention where each rectifier group is excited by its own control voltage generators.

The synchronous generator 1 shown in FIGURE 1 is connected on the same shaft 2 as the exciter 3 and the control voltage generator 4. The exciter 3 and control voltage generator 4 are, in the shown embodiment, made as rotating armature machines. The excitation field 5 of the synchronous generator is connected between the zero point on the Y-connected rotor-winding of the exciter and the reactors 6. Further, to the rotor winding of the exciter are connected two anti-parallel connected rectifier groups each containing three semi-conductor rectifiers 7 and 8, the rectifier groups being mutually joined in an electric connection point via the reactors 6. The rotor of the control voltage generator 4 is placed on the same shaft 2 as the rotor of the exciter 3 and by suitable adjustment of stator and rotor in the two machines in relation to each other the desired angle displacement is obtained between them. The voltage produced by the control voltage generator 4 is fed directly to the controllable rectifier group 7 while the rectifier group 8 obtains its control voltage via an insulating transformer 9. The zero-point of the Y-connected rotor winding of the control voltage generator is further connected to the common connection point of the rectifier group 7.

Since the rotor of the control voltage generator and the rotor of the exciter have a certain angle displacement, the control voltage also obtains a certain determined angle position dictated by the angles between the rotor and stator or the exciter and the rotor and stator of the control voltage generator. These angles are set so that the inverter is ensured the desired commutation margin and the rectifier operates with a corresponding control angle. By varying the direct current excitation of the exciter the alternating voltage of the exciter machine can be varied and thus also the current through the field winding 5. When the polarity on the field winding of the exciter is altered, the phase position of the alternating voltage of the exciter is displaced 180° and the rectifier group which before acted as rectifier will now act as inverter and vice versa, whereby the current in the field winding 5 changes direction. Thus by varying the excitation voltage of the exciter the excitation voltage and current of the main machine can be controlled to the desired value and direction.

Figure 2:
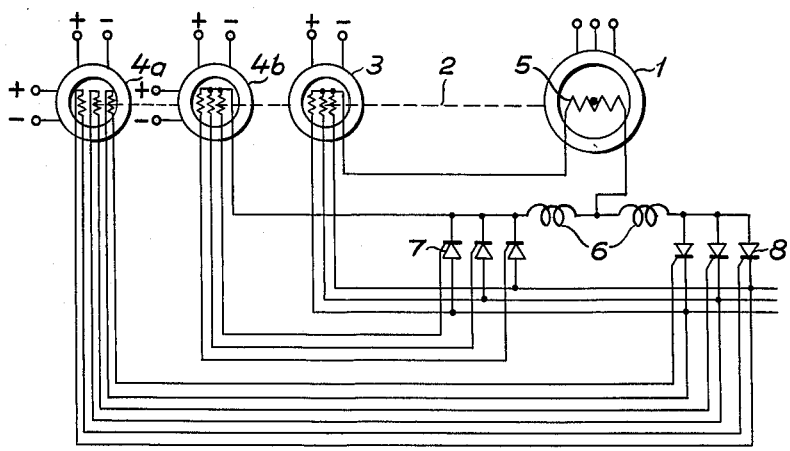

The arrangement shown in FIGURE 2 has been provided with the same designations as in FIGURE 1. The control voltage generator is in the embodiment according to FIGURE 2 divided into two units 4a and 4b each provided with double field windings placed 90° electrical away from each other. The control voltage generators 4a and 4b are so arranged that each controls one of the rectifier groups 7 and 8 respectively. In the embodiment according to FIGURE 2 the excitation of the exciter 3 is constant and the current through the field winding 5 of the synchronous generator 1 is instead controlled by the field windings of both the control voltage generators 4a and 4b. By varying the excitation currents in each of the two control voltage generators 4a and 4b in the two field windings in relation to each other the position of the resultant field in these generators and thus the phase position of the voltages produced by them may be arbitrarily altered. In this way the rectifier groups may be ignited at the desired moment and the excitation current adjusted to the desired value and direction.

Since in both embodiments the rectifiers are placed on the shaft and since both the exciter and the control voltage generators are rotating armature machines, slip rings and commutators are avoided and the rectifiers are well cooled when they rotate on the shaft 2.

The embodiments of the invention shown here are particularly advantageous. However, several other embodiments are possible within the scope of the invention.

If, for example, in the control voltage generator according to FIGURE 1 the poles are formed having constant air gap to the rotor, the flow will be constant over the pole surfaces and the control voltage will receive the character of rectangular pulses. This is usually considered desirable when controlling semi-conductor rectifiers. By varying the pole arc and coil pitch the length of these rectangular pulses may be varied. It is considered advantageous in this case if the coil pitch is chosen equal to 180° el. ÷ pole arc. With this distribution each half period of the control voltage produced will consist of a pulse the length of which is double the pole arc followed by a voltageless period of 180° el. ÷ double pole arc if this is less than 90° el. If the pole arc is greater than 90° el. the pulse length will be 360° el. ÷ double pole arc while the voltageless period will be double the pole arc ÷ 180° el. If the pole arc is 90° el. the pulse length will be 180° el.

I claim:
1. In combination with a synchronous generator having a rotating field system, an exciter set comprising an exciter generator having a rotating armature and at least one multiphase synchronous control voltage generator having a rotating armature, a shaft, said two armatures of said exciter set together with said rotating field system of said synchronous generator being mounted on said shaft, means to feed the output of said exciter to the field winding of said synchronous generator, said feeding means including a plurality of controlled semi-conductor rectifiers each provided with a control electrode and having ionic rectifier characteristic, said rectifiers forming two converter groups, one group operating as an inverter and the other as a rectifier, said rectifiers being mounted on said shaft and means to feed the output of each phase of said control voltage generator to one of the control electrodes of the rectifiers in each group, the field of at least one of said exciter and control voltage generators being variable.

2. In a combination as claimed in claim 1, said control voltage generator having permanent magnets for its excitation.

3. In a combination as claimed in claim 1, said means for feeding the output of the control voltage generator to the control electrodes of one of said groups including a transformer.

4. In a combination as claimed in claim 1, comprising two control voltage generators, each controlling one of said converter groups.

5. In a combination as claimed in claim 1, said means to feed the output of the control voltage generator to said two converter groups including means to displace the control pulses by 180° in relation to each other.

6. In a combination as claimed in claim 1, said control voltage generator provided with two field windings, said two field windings being displaced 90° in relation to each other.

7. In a combination as claimed in claim 1, said control voltage generator having poles, the air gaps between said poles and the armature of said generator having constant width along the whole surface of the pole.

8. In a combination as claimed in claim 7, the armature of said control voltage generator being wound with a coil pitch equal to 180° minus the so-called pole arc.

References Cited by the Examiner
UNITED STATES PATENTS

| | | | |
|---|---|---|---|
| 2,629,853 | 2/1953 | Harder et al. | 322—73 |
| 3,032,700 | 5/1962 | Cecil et al. | 322—73 |
| 3,070,740 | 12/1962 | Chirgwin et al. | 322—73 |

MILTON O. HIRSHFIELD, *Primary Examiner.*

LLOYD McCOLLUM, *Examiner.*